United States Patent
Rudowicz

(10) Patent No.: US 7,062,277 B2
(45) Date of Patent: Jun. 13, 2006

(54) MULTIPLE INBOUND CHANNEL GRANTING METHOD AND APPARATUS

(75) Inventor: Michael Rudowicz, Lake Worth, FL (US)

(73) Assignee: Motorola, Inc., Schaumburg, IL (US)

( * ) Notice: Subject to any disclaimer, the term of this patent is extended or adjusted under 35 U.S.C. 154(b) by 394 days.

(21) Appl. No.: 10/337,599

(22) Filed: Jan. 7, 2003

(65) Prior Publication Data

US 2004/0203811 A1    Oct. 14, 2004

(51) Int. Cl.
    *H04Q 7/22* (2006.01)
(52) U.S. Cl. .................... 455/452.1; 370/341
(58) Field of Classification Search ........... 455/450, 455/451, 452.1, 452.2, 453, 454
    See application file for complete search history.

(56) References Cited

U.S. PATENT DOCUMENTS

| | | | |
|---|---|---|---|
| 5,020,130 A * | 5/1991 | Grube et al. ............... | 455/9 |
| 6,094,429 A | 7/2000 | Blanchette et al. | |
| 6,532,225 B1 * | 3/2003 | Chang et al. ............... | 370/341 |
| 6,836,469 B1 * | 12/2004 | Wu ............................ | 370/322 |
| 6,842,432 B1 * | 1/2005 | Stogner et al. ............. | 370/265 |

* cited by examiner

*Primary Examiner*—George Eng
*Assistant Examiner*—Julie E Stein

(57) ABSTRACT

A system (100) grants inbound channel capacity using frequency and time diversity by wirelessly transmitting on a first (202) of a plurality of outbound channels (202–208) a first (511) of a plurality of first inbound channel grant signals (511–514) for controlling transmission of a multiple channel mobile station (106) on a plurality of inbound channels (212–218). Thereafter, on a second (204) of the plurality of outbound channels a second (512) of the plurality of first inbound channel grant signals is wirelessly transmitted. Furthermore, the system (100) grants inbound channel capacity using time diversity by wirelessly transmitting on the first (202) of the plurality of outbound channels all of a plurality of second inbound channel grant signals (521–524) for controlling transmission of a single channel mobile station (104) on one (212) of the plurality of inbound channels are transmitted.

19 Claims, 2 Drawing Sheets

MULTIPLE INBOUND CHANNEL GRANTING METHOD AND APPARATUS

FIELD OF THE INVENTION

The present invention generally relates to the field of wireless mobile communication, and more particularly relates to the granting of inbound channels to a mobile station.

BACKGROUND OF THE INVENTION

A majority of current communication networks, such as digital cellular, provide data and voice services based on circuit switched technology. Such systems provide voice services by statically allocating a constant bandwidth to provide a circuit for each voice device. However, the utilization of transmission resources in circuit switching is suboptimal for data services, such as mobile Internet access, because the transmission connection is maintained throughout the contact, without regard as to whether information is being transmitted at any given moment. Dynamic channel allocation protocols define a packet channel in the unused voice circuit channel capacity. This provides for voice and packet data services to be efficiently provided on a common carrier where the data services are provided on a packet channel that occupies bandwidth left unused by the voice services.

Data services are provided to mobile stations. When it is necessary for a mobile station to transmit data packets, the mobile station transmits a reservation request to the fixed network equipment indicating the amount of data to be transmitted. Upon reception of the reservation request on the inbound channel, the fixed network equipment transmits a channel grant signal on the outbound channel granting the mobile station timeslots for transmission of the data packets on the inbound channel. In this way the mobile station is allocated inbound channel capacity. However, if interference or noise corrupts the reception of the channel grant signal by the mobile station, the mobile station will not transmit on the allocated inbound channel capacity, and the allocated inbound channel capacity will consequently go unused. In response, the mobile station will retransmit the reservation request and the granting signal will be retransmitted. The resulting retransmissions and unused inbound channel capacity can significantly degrade the capacity of the wireless communication system. Thus, a plurality of inbound channel grant signals, typically four, are transmitted by the fixed network equipment. If a first of the plurality of channel grant signals is missed by the mobile station due to noise or interference, then a subsequent of the plurality of channel grant signals will be received. This provides a time diversity redundancy that reduces the likelihood of the retransmissions and increases the system capacity.

Prior art mobile stations are single channel devices. When a grant signal is received on an outbound channel, the inbound capacity is reserved on a paired inbound channel having a predetermined relationship with the outbound channel. However, single channel devices are limited with respect to the rate at which data can be received or transmitted by the mobile stations. Fixed network equipment typically transmit multiple carriers, typically but not necessarily limited to four, within a cell. This provides for a plurality of inbound and outbound packet channels within a cell. Improved multiple channel mobile stations have the advantage of being able to simultaneously receive and/or transmit data on a plurality of outbound and/or inbound packet channels when the fixed network equipment relates the multiple inbound and outbound channel capacity for each multiple channel mobile station. As a result, the data rate of data services can be significantly increased to a multiple channel mobile station. This facilitates an enhanced Internet or other network access experience by a user of the multiple channel mobile station.

It is desirable to provide a system that facilitates voice, single channel data services and multiple channel data services within each cell. Single channel data services transmit a plurality of channel grant signals on one of the plurality of outbound channels. It is desirable that multiple channel data services maintain the advantage of transmitting the plurality of channel grant signals while taking further advantage of frequency diversity provided by the multiple channel data services.

SUMMARY OF THE INVENTION

According to a preferred embodiment of the present invention, a device for granting inbound channel capacity comprises a multiple channel mobile station channel granter for generating for transmission on a first of a plurality of outbound channels, a first of a plurality of first inbound channel grant signals for controlling transmission of a first mobile station on a plurality of inbound channels and for generating for transmission on a second of the plurality of outbound channels, a second of the plurality of first inbound channel grant signals. The device further comprises a single channel mobile station channel granter for generating on the first of a plurality of outbound channels, all of a plurality of second inbound channel grant signals for controlling transmission of a second mobile station on the first of the plurality of inbound channels.

According to a preferred embodiment of the present invention, a method comprises the steps of wirelessly transmitting on a first of a plurality of outbound channels a first of a plurality of first inbound channel grant signals for controlling transmission of a first mobile station on a plurality of inbound channels, and substantially immediately thereafter wirelessly transmitting on a second of the plurality of outbound channels a second of the plurality of first inbound channel grant signals.

DETAILED DESCRIPTION

The present invention, according to a preferred embodiment, facilitates an enhanced reliability of reception of a plurality of inbound channel grant signals by efficiently adding frequency diversity to the time diversity transmission of the plurality of inbound channel grant signals without increasing the overall number of repeat inbound channel grant signals.

Figure 1:
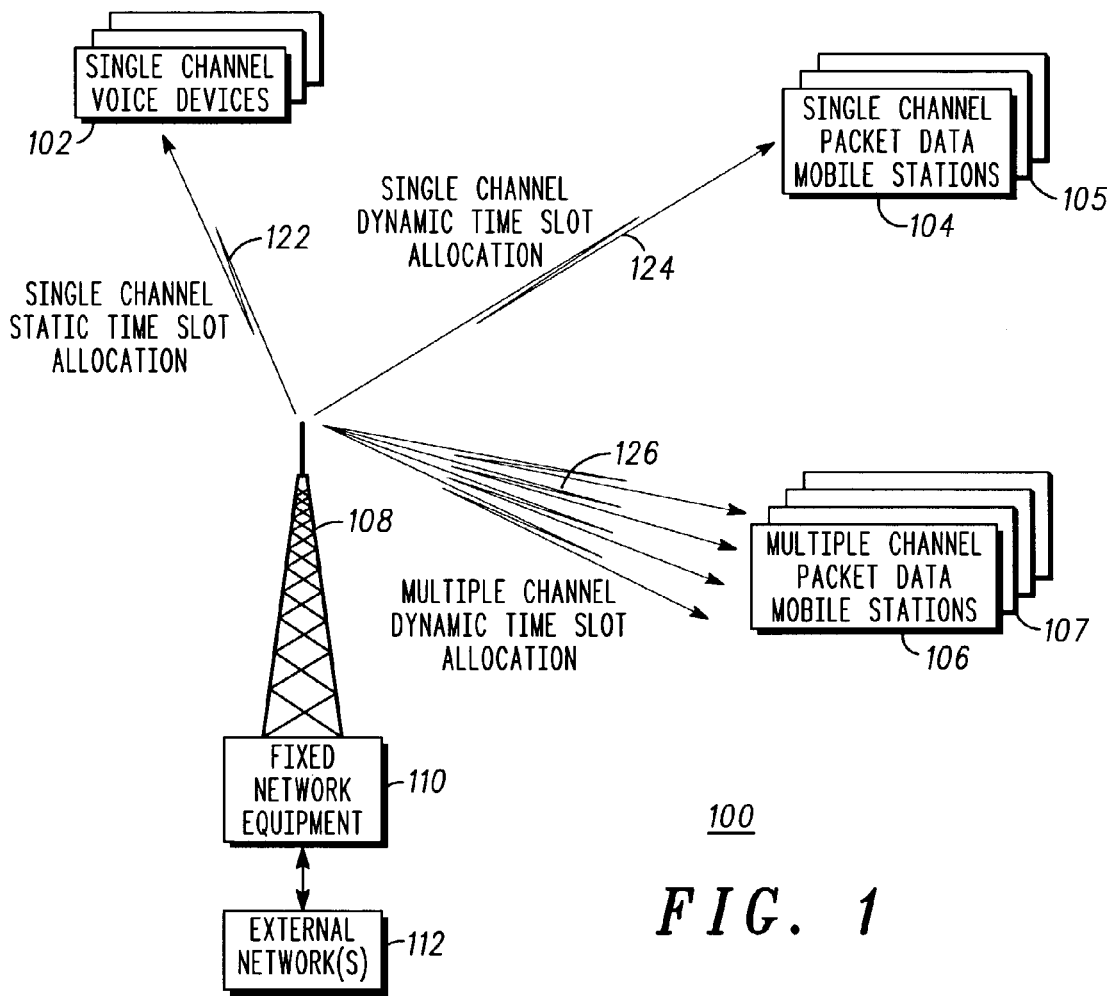
FIG. 1 is a block diagram illustrating a system according to a preferred embodiment of the present invention.

FIG. 1 is a block diagram illustrating a system according to a preferred embodiment of the present invention. According to a preferred embodiment of the present invention, as shown in FIG. 1 a wireless system 100 provides voice services to a plurality of voice devices 102, such as cellular telephones, and data services to single channel mobile stations 104–105 and multiple channel mobile stations 106–107. One or more base radios 108 form a one cell of a multiple cell communication system, other cells of the system are not shown. The base radio 108 wirelessly couples devices 102–107 to fixed network equipment 110 which is coupled to one or more external networks 112 such as the public switch telephone network and/or the Internet, thereby facilitating voice and data services. Mobile stations 104–107 may have voice service capabilities an addition to data services.

Figure 2:
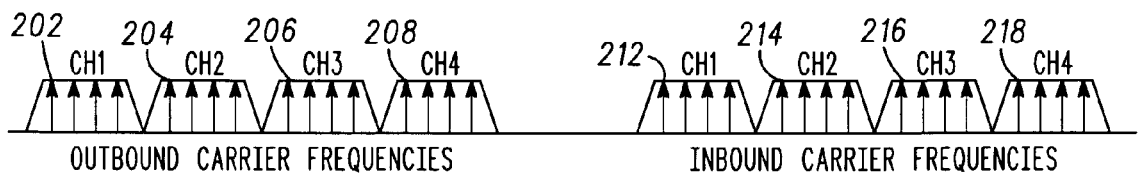
FIG. 2 is a frequency domain diagram of the carriers of a base radio in accordance with a preferred embodiment of the present invention.

FIG. 2 is a frequency domain diagram of the carriers of a base radio in accordance with a preferred embodiment of the present invention. Preferably each base radio 108 transmits on up to four outbound carriers 202, 204, 206 and 208 paired with up to four inbound carriers 212, 214, 216 and 218. Indicative of a frequency division duplex system (FDD) a base radio may utilize either one, two, three or four carrier pairs. FIG. 2 shows that each of the plurality of outbound channels is comprised within a first substantially unique frequency spectrum and each of the plurality of inbound channels is comprised within a second substantially unique frequency spectrum.

A base radio transmits to a voice device 102 or a single channel mobile station 104 on an outbound carrier 202, 204, 206 or 208 and receives from the voice device 102 or mobile station 104 on the corresponding inbound carrier 212, 214, 216 or 218. A base radio transmits to a multiple channel mobile station 108 on up to four outbound carriers 202–208 and receives from the mobile station 108 on up to four inbound carrier 212–218. Each carrier 202–218 is digitally modulated with information on four subchannels that are modulated at a predetermined symbol rate using either QPSK, 16-QAM or 64-QAM. Indicative of a time division multiple access system (TDMA) carriers are divided into timeslots. A voice service typically occupies every third timeslot on both inbound and outbound carrier pairs. A plurality of timeslots are grouped into frames. Each outbound frame includes a dynamic channel allocation protocol signal indicating which timeslots within the frame are available for a packet channel. The packet channel facilitates data services. Outbound packet channel timeslots include slot descriptor blocks that provide information indicative of the type of information included in the timeslot. Types of information included within slots include packet data for reception by a designated mobile station as well as channel grant signals for controlling transmission of a mobile station on inbound channels. A channel grant signal for a single channel mobile station 104 received on an outbound packet channel will control the transmission of the mobile station on a corresponding inbound packet channel by indicating which timeslots on the corresponding inbound packet channel are allocated to the mobile station. A channel grant signal for a multiple channel mobile station 106 received on any of the outbound packet channels will control the transmission of the mobile station on a any or all of the inbound packet channels by indicating which packet channels and timeslots are allocated to the mobile station.

Referring back to FIG. 1, FIG. 1 shows that a base radio 108 communicates with a voice device 102 on a single channel using static timeslot allocation 122. For example, every third inbound and outbound timeslot is allocated to the voice device to facilitate voice services. The base radio 108 communicates with a single channel mobile station 104 on a single packet channel using dynamic timeslot allocation 124. For example, timeslots on a single packet channel are allocated to the mobile station depending upon the amount of data to be transmitted to or received from the single channel mobile station. The base radio 108 communicates with a multiple channel mobile station 106 on one or more packet channel using dynamic timeslot allocation 126. For example timeslots on one or more packet channels are allocated to the mobile station depending upon the amount of data to be transmitted to or received from the multiple channel mobile station.

Figure 3:
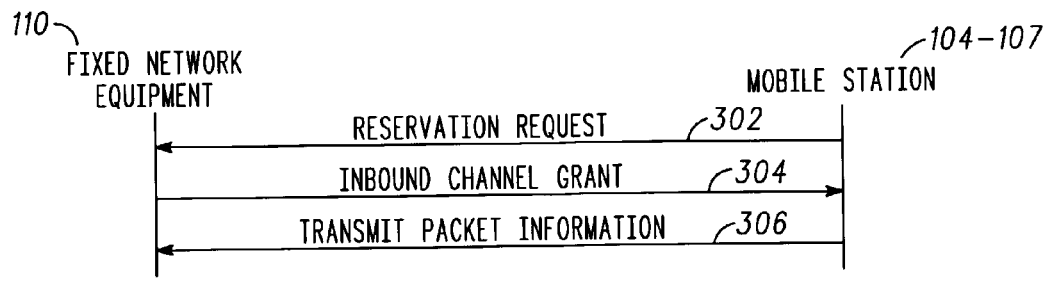
FIG. 3 is a signaling diagram in accordance with a preferred embodiment of the present invention.

FIG. 3 is a signaling diagram. When a mobile station 104–107 has packet data to send to the fixed network equipment 110, a reservation request 302 is sent. The reservation request is sent on the inbound packet channel during a timeslot allocated for reservation requests. Reservation requests are sent using a contention system known to those familiar with the art that provides for reception of reservation requests from multiple mobile stations. Upon reception of a reservation request by the fixed network equipment, inbound timeslots (and inbound channels for the multiple channel mobile station) are allocated and an inbound channel grant signal 304 is communicated to the mobile station. The inbound channel grant signal is sent a plurality of times to better assure reception by the mobile station. If the inbound channel grant signal is not received due to noise or interference, then a retransmission sequence known to those familiar with the art is invoked and the inbound timeslots will go unused. Thus, transmitting a plurality of inbound channel grant signals helps prevent a decrease in system capacity. Upon reception of at least one of the plurality of inbound channel grant signals, the mobile station transmits on the inbound channel or channels using the timeslots indicated in the received inbound channel grant signal.

Figure 4:
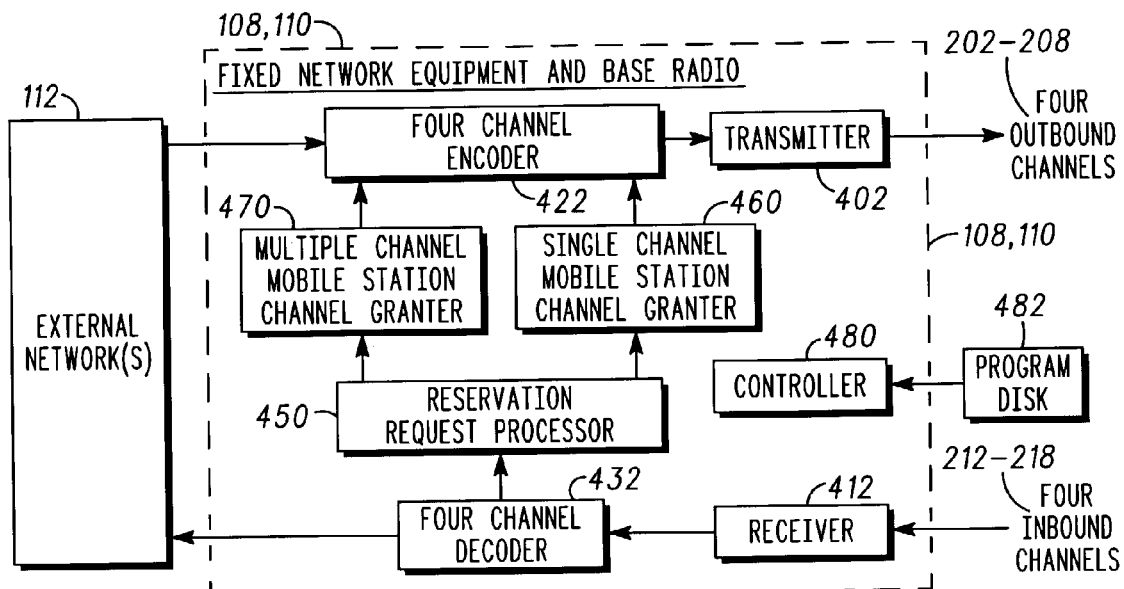
FIG. 4 is a block diagram of the fixed network equipment and the base radio in accordance with a preferred embodiment of the present invention.

FIG. 4 is a block diagram of the fixed network equipment and the base radio in accordance with a preferred embodiment of the present invention. The fixed network equipment 110 is coupled to the external networks 112 to facilitate voice and data services. Indicative of a multiple channel FDD-TDMA system, base radio 108 transmits timeslots on a plurality of outbound channels 202–208 using transmitter 402 and receives timeslots on a corresponding plurality of inbound channels 212–218 using receiver 412. As is known to those familiar with the art, four channel encoder 422 and four channel decoder 432 encode and decode voice and data services for communication between the external networks 112 and the voice devices and mobile stations 102–106.

A reservation request processor 450 process the inbound channel for reservation request signals 302. If the reservation request is from a single channel mobile station, then single channel mobile station channel granter 460 allocates timeslots on the corresponding inbound packet channel and generates a plurality of inbound channel grant signals. All of the plurality of the inbound channel grant signals are transmitted on a first of the plurality of outbound channels. This has the advantage of providing for time diversity to assure the reception of at least one of the plurality of inbound channel grant signals.

If the reservation request is from a multiple channel mobile station, then multiple channel mobile station channel granter 470 allocates timeslots and packet channels and generates a plurality of inbound channel grant signals. A first of the plurality of the inbound channel grant signals is transmitted on a first of the plurality of outbound channels and a second of the plurality of outbound channel grant signals is transmitted on a second of the plurality of outbound channels. This has the advantage of not only providing for time diversity to assure the reception of at least one of the plurality of inbound channel grant signals, but also add the assurance frequency diversity to reception of at least on of the plurality of inbound channel grant signals.

A controller 480 at least partially implements the functions of the fixed network equipment and base radio 108, 110. Controller 480 may be one or more programmable computing devices such as microprocessors, microcomputers, digital signal processors or other programmable circuits. Programming instructions are included on a computer readable media 482 which may be one or more programming disks or other computer memory may be communicated to the controller by a network or other means known to those familiar with the art.

Figure 5:
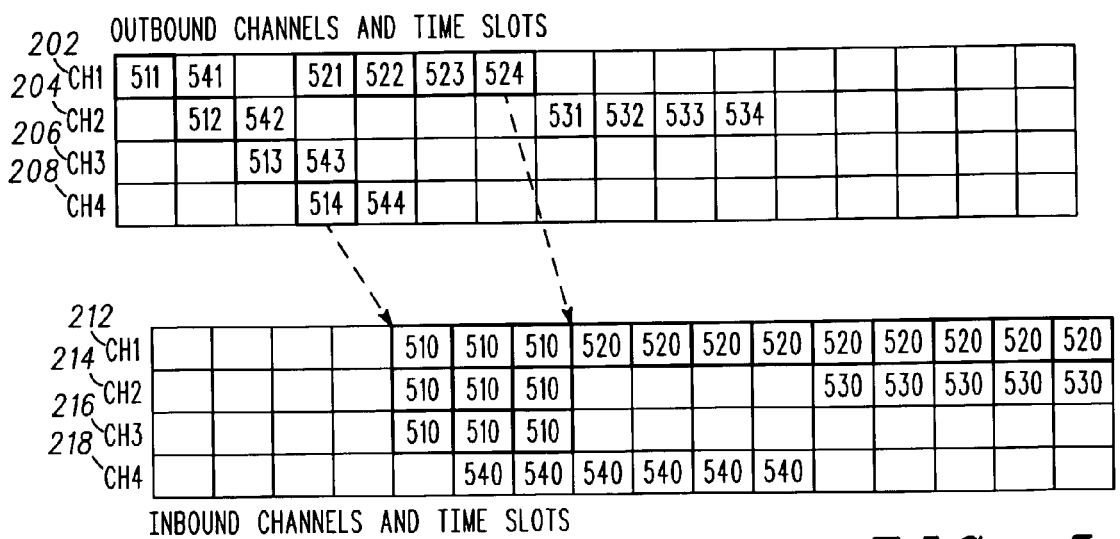
FIG. 5 is a time domain diagram of the allocation of inbound packet channels in accordance with a preferred embodiment of the present invention.

FIG. 5 is a time domain diagram of the allocation of inbound packet channels in accordance with a preferred embodiment of the present invention. Timeslots on four outbound packet channels 202, 204, 206 and 208 are shown with timeslots on four corresponding inbound packet channels 212, 214, 216 and 218. FIG. 5 shows four pluralities of inbound channel grant signals for four mobile stations. Each plurality of inbound channel grant signals is sent four times in four consecutive timeslots. The plurality of inbound channel grant signals for a single channel mobile station are transmitted on a single outbound channel and the plurality of inbound channel grant signals for multiple channel mobile stations transmitted on multiple outbound channels.

Timeslots 511–514 represent the plurality of inbound channel grant signals transmitted on the plurality of outbound channels 202, 204, 206 and 208 for a first mobile station 106 that has multiple channel capabilities. Each of the plurality of inbound channel grant signals 511 through 514 indicates that the first mobile station is allocated three consecutive timeslots on three inbound channels, providing for a total of nine total timeslots 510 on the inbound channels 212, 214 and 216.

Timeslots marked 521–524 represent the plurality of inbound channel grant signals, all of which are transmitted on one of the plurality of outbound channels 202 for a second mobile station 104 that has single channel capabilities. Each of the plurality of inbound channel grant signals 521–524 indicates that the second mobile station is allocated nine consecutive timeslots 520 on the paired inbound channel 212.

Timeslots marked 531–534 represent the plurality of inbound channel grant signals, all of which are transmitted on one of the plurality of outbound channels 204 for a third mobile station 105 that has single channel capabilities. Each of the plurality of inbound channel grant signals 531–534 indicates that the third mobile station is allocated five consecutive timeslots marked 530 on the paired inbound channel 214.

Timeslots marked 541–544 represent the plurality of inbound channel grant signals transmitted on the plurality of outbound channels 202, 204, 206 and 208 for a fourth mobile station 107 that has multiple channel capabilities. Each of the plurality of inbound channel grant signals 541–544 indicates that the fourth mobile station is allocated six consecutive timeslots 540 on the a single inbound channels 218.

FIG. 5 shows granting inbound channel capacity comprising the step of wirelessly transmitting on a first 202 of a plurality of outbound channels 202–208 a first 511 of a plurality of first inbound channel grant signals 511–514 for controlling transmission of a first mobile station 106 on a plurality of inbound channels 212–218. FIG. 5 shows granting inbound channel capacity further comprising the step of wirelessly transmitting on a second 204 of the plurality of outbound channels a second 512 of the plurality of first inbound channel grant signals. FIG. 5 shows granting inbound channel capacity further comprising the step of wirelessly transmitting on the first 202 of a plurality of outbound channels all of a plurality of second inbound channel grant signals 521–524 for controlling transmission of a second mobile station 104 on the first 212 of the plurality of inbound channels.

FIG. 5 shows granting inbound channel capacity further comprising the step of wirelessly transmitting on a third 206 of the plurality of outbound channels a third 513 of the plurality of first inbound channel grant signals and wirelessly transmitting on a fourth 208 of the plurality of outbound channels a fourth 514 of the plurality of first inbound channel grant signals. FIG. 5 also shows that the second 512 of the plurality of first inbound channel grant signals is transmitted substantially immediately after transmission of the first 511 of the plurality of first inbound channel grant signals, the third 513 of the plurality of first inbound channel grant signals is transmitted substantially immediately after transmission of the second 512 of the plurality of first inbound channel grant signals, and the fourth 514 of the plurality of first inbound channel grant signals is transmitted substantially immediately after transmission of the third 513 of the plurality of first inbound channel grant signals. FIG. 5 shows granting inbound channel capacity further comprising the step of wirelessly transmitting on the second 204 of the plurality of outbound channels all of a plurality of third inbound channel grant signals 5431–534 for controlling transmission of a third mobile station 105 on a second 214 of the plurality of inbound channels.

FIG. 5 shows granting inbound channel capacity further comprising the step of wirelessly transmitting on the first 202 of the plurality of outbound channels a first 541 of a plurality of fourth inbound channel grant signals 541–544 for controlling transmission of a fourth mobile station 107 on the plurality of inbound channels while simultaneously wirelessly transmitting on the second 204 of the plurality of outbound channels the second 512 of the plurality of first inbound channel grant signals, occurring after wirelessly transmitting on the first 202 of the plurality of outbound channels the first 511 of a plurality of first inbound channel grant signals.

FIG. 5 also shows a plurality of first inbound channel grant signals 541–544 controlling transmission of the fourth mobile station 107 on only one 218 of the plurality of inbound channels.

FIG. 5 also shows the plurality of first inbound channel grant signals 511–514 controls transmission of the first mobile station 106 on at least the first 212 and the second 214 of the plurality of inbound channels.

FIG. 5 also shows a method for granting inbound channel capacity comprising the step of wirelessly transmitting on a first 202 of a plurality of outbound channels 202–208 a first 511 of a plurality of first inbound channel grant signals 511–514 for controlling transmission of a first mobile station 106 on a plurality of inbound channels 212–216, and substantially immediately thereafter wirelessly transmitting on a second 204 of the plurality of outbound channels 202–208 a second 512 of the plurality of first inbound channel grant signals.

Also described is a computer readable media 482 comprising computer instructions for transmitting on a first 202 of a plurality of outbound channels 202–208 a first 511 of a plurality of first inbound channel grant signals 511–514 for controlling transmission of a first mobile station 106 on a plurality of inbound channels 212–216, and substantially immediately thereafter transmitting on a second 204 of the plurality of outbound channels a second 521 of the plurality of first inbound channel grant signals.

FIG. 5 shows the advantage of frequency and time diversity transmission of the plurality of inbound channel grant signals 511–514 transmitted on multiple channels compared to the time diversity transmission of the plurality of inbound channel grant signals 521–524 on a single channel. The transmission characteristics of each frequency carrier of each channel may be significantly different, each frequency band including different noise and interference characteristics. Thus, if one channel 202 had sustained poor transmission characteristics, the single channel mobile station may not receive any of the plurality of inbound channel grant signals 521–524. However, the likelihood that all four channels 202–208 have poor sustained transmission characteristics is less because the transmission characteristics of each channel are substantially independent. Thus, the multiple channel mobile station is more likely to receive at least one of the plurality of inbound channel grant signals 511–514. This added frequency diversity improves the robustness of the communication of the inbound channel grant signal. Note further that multiple channel mobile stations may be granted timeslots on one (540 for example), two, three (510 for example) or all of the inbound channels.

The present invention can be realized in hardware, software, or a combination of hardware and software. A system according to a preferred embodiment of the present invention can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein.

The present invention can also be embedded in a computer program product, which comprises all the features enabling the implementation of the methods described herein, and which—when loaded in a computer system—is able to carry out these methods. Computer program means or computer program in the present context mean any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium allowing a computer to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer medium may include, for example, volatile storage such as RAM, buffers, cache memory, and network circuits. Furthermore, the computer readable medium may comprise computer readable information in a transitory state medium such as a network link and/or a network interface, including a wired network or a wireless network, that allow a computer to read such computer readable information.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention. For example, the plurality of inbound channel grant signals is shown as four, other numbers are anticipated and may be varied on an individual channel grant basis. Also, while the preferred embodiment is described in a frequency division duplex (FDD) system, those familiar with the art will appreciate that the claimed subject matter also applies to other duplex systems including time division duplex (TDD) systems. Furthermore, while the preferred embodiment is described in as a time division multiple access (TDMA) the claimed subject matter, where not specifically limited may apply to other multiple access systems such as code division multiple access (CDMA) systems.

What is claimed is:

1. A method for granting inbound channel capacity comprising the steps of:
    wirelessly transmitting on a first of a plurality of outbound channels a first of a plurality of first inbound channel grant signals for controlling transmission of a first mobile station on a plurality of inbound channels;
    wirelessly transmitting on a second of the plurality of outbound channels a second of the plurality of first inbound channel grant signals; and
    wirelessly transmitting on the first of the plurality of outbound channels all or a plurality of second inbound channel grant signals for controlling transmission of a second mobile station on a First of the plurality of inbound channels;
    wherein the plurality of first inbound channel grant signals controls transmission of the first mobile station on at least the first and the second of the plurality of inbound channels.

2. The method according to claim 1 further comprising the step of
    wirelessly transmitting on the second of the plurality of outbound channels all of a plurality of third inbound channel grant signals for controlling transmission of a third mobile station on a second of the plurality of inbound channels.

3. The method according to claim 1 wherein
    only one of the plurality of first inbound grant signals is transmitted on the first of the plurality or outbound channels and
    only one of the plurality of first inbound grant signals is transmitted on the second of the plurality of outbound channels.

4. The method according to claim 1 wherein the first and second of the plurality of first inbound channel grant signals are not transmitted simultaneously.

5. The method according to claim 4 wherein
    only one of the plurality of first inbound grant signals is transmitted on the first of the plurality of outbound channels and only one of the plurality of first inbound grant signals is transmitted on the second of the plurality of outbound channels.

6. The method according to claim 1 further comprising the step of
wirelessly transmitting on the first of the plurality of outbound channels a first of a plurality of fourth inbound channel grant signals for controlling transmission of a fourth mobile station on the plurality of inbound channels
simultaneously with said step of wirelessly transmitting on the second of the plurality of outbound channels the second of the plurality of first inbound channel grant signals; and
after said step of wirelessly transmitting on the first of the plurality of outbound channels the first of the plurality of first inbound channel grunt signals.

7. The method according to claim 1 wherein each of the plurality of outbound channels and each of the plurality of inbound channels is comprise within a substantially unique frequency spectrum.

8. A method according to claim 1 further comprising the steps of:
wirelessly transmitting on a third of the plurality of outbound channels a third of the plurality of first inbound channel grant signals; and
wirelessly transmitting on a Fourth of the plurality of outbound channels a fourth of the plurality of first inbound channel grant signals.

9. The method according to claim 8 wherein
the second of the plurality of First inbound channel grant signals is transmitted after transmission of the first of the plurality of first inbound channel grant signals.
the third of the plurality of first inbound channel grant signals is transmitted after transmission of the second of the plurality of first inbound channel grant signals, and
the fourth of the plurality of first inbound channel grant signals is transmitted alter transmission of the third of the plurality of first inbound channel grant signals.

10. A method for granting inbound channel capacity comprising the steps of:
wirelessly transmitting on a first of a plurality of outbound channels a first of a plurality of first inbound channel grant signals For controlling transmission of a first mobile station on a plurality of inbound channels; and thereafter
wirelessly transmitting on a second of the plurality of outbound channels a second of the plurality of first inbound channel grant signals;
wherein the plurality of first inbound channel rant signals control transmission of the first mobile station on at least the first and the second of the plurality of inbound channels.

11. The method according to claim 10 wherein
only one of the plurality of first inbound grant signals is transmitted on the first of the plurality of outbound channels and
only one of the plurality of first inbound grant signals is transmitted on the second of the plurality of outbound channels.

12. The method according to claim 10 wherein
each of the plurality of outbound channels is comprise within a first substantially unique frequency spectrum and each of the plurality of inbound channels is comprise within a second substantially unique frequency spectrum.

13. The method according to claim 10 further comprising the step of:
wirelessly transmitting on the first of the plurality of outbound channels all of a plurality of second inbound channel grant signals for controlling transmission of a second mobile station on the first of a plurality of inbound channels.

14. A method according to claim 10 further comprising the steps of:
wirelessly transmitting on a third of the plurality of outbound channels a third of the plurality of first inbound channel grant signals; and
wirelessly transmitting on a fourth of the plurality of outbound channels a fourth of the plurality of First inbound channel grant signals.

15. The method according to claim 14 wherein
the third of the plurality of first inbound channel grant signals is transmitted after transmission of the second of the plurality of first inbound channel grant signals, and
the fourth of the plurality of first inbound channel grant signals is transmitted after transmission of the third of the plurality of first inbound channel grant signals.

16. A device for granting inbound channel capacity comprising:
a multiple channel mobile station channel granter for generating for transmission on a first of a plurality of outbound channels a first of a plurality of first inbound channel grant signals for controlling transmission of a first mobile station on a plurality of inbound channels and for
generating for transmission on a second of the plurality of outbound channels a second of the plurality of first inbound channel grant signals; and
a single channel mobile station channel granter for generating on the first of the plurality of outbound channels all of a plurality of second inbound channel grant signals for controlling transmission of a second mobile station on a first of the plurality of inbound channels;
wherein:
only one of the plurality of first inbound grant signals is generated on the first of the plurality or outbound channels.
only one of the plurality of first inbound grant signals is generated on a second of the plurality of outbound channels, and
the first and second of the plurality of first inbound channel grant signals are not transmitted simultaneously.

17. The multiple channel mobile station channel granter according to claim 16 further For
generating for transmission on a third of the plurality of outbound channels a third of the plurality of first inbound channel grant signals; and
generating for transmission on a fourth of the plurality of outbound channels a Fourth of the plurality of first inbound channel grant signals, wherein
the second of the plurality of first inbound channel grant signals is transmitted substantially immediately after transmission of the first of the plurality of first inbound channel grant signals,
the third of the plurality of rust inbound channel grant signals is transmitted substantially immediately after transmission of the second of the plurality of first inbound channel grant signals, and the fourth of the plurality of first inbound channel grant signals is transmitted substantially immediately after transmission of the third of the plurality of first inbound channel grant signals.

18. A computer readable media comprising computer instructions for:

transmitting on a first of a plurality of outbound channels a first of a plurality of first inbound channel grant signals for controlling transmission of a first mobile station on a plurality of inbound channels;

after transmitting on the first of the plurality of outbound channels, transmitting on a second of the plurality of outbound channels a second of the plurality of first inbound channel grant signals;

transmitting on a third of the plurality of outbound channels a third of the plurality of first inbound channel grant signals; and transmitting on a fourth of the plurality of outbound channels a fourth of the plurality of first inbound channel grant signals wherein the third of the plurality of first inbound channel grant signals is transmitted after transmission of the second of the plurality of first inbound channel grant signals, and the fourth of the plurality of First inbound channel grant signals is transmitted after transmission of the third of the plurality of first inbound channel rant signals.

19. The computer readable media according to claim 18 further comprising instructions for transmitting on the first of the plurality of outbound channels all of a plurality of second inbound channel grant signals for controlling transmission of a second mobile station on a first of the plurality of inbound channels.

* * * * *